(12) United States Patent
Shiu et al.

(10) Patent No.: US 8,675,799 B2
(45) Date of Patent: Mar. 18, 2014

(54) CIRCUIT FOR GENERATING A CLOCK DATA RECOVERY PHASE LOCKED INDICATOR AND METHOD THEREOF

(75) Inventors: Huei-Chiang Shiu, New Taipei (TW); Hsuan-Ching Chao, Keelung (TW); Kuo-Cyuan Kuo, Tainan (TW); Ming-Kia Chen, Taoyuan County (TW)

(73) Assignee: Etron Technology, Inc., Hsinchu (TW)

( * ) Notice: Subject to any disclaimer, the term of this patent is extended or adjusted under 35 U.S.C. 154(b) by 524 days.

(21) Appl. No.: 13/050,968

(22) Filed: Mar. 18, 2011

(65) Prior Publication Data
US 2011/0293055 A1    Dec. 1, 2011

Related U.S. Application Data

(60) Provisional application No. 61/350,032, filed on Jun. 1, 201, provisional application No. 61/357,088, filed on Jun. 21, 2010.

(30) Foreign Application Priority Data

Jan. 17, 2011   (TW) .............................. 100101627 A

(51) Int. Cl.
    *H04L 7/00* (2006.01)
(52) U.S. Cl.
    USPC ......................................... 375/372; 375/355

(58) Field of Classification Search
    USPC ................. 375/316, 354, 355, 371, 373, 377; 708/270, 290, 400, 402
    See application file for complete search history.

(56) References Cited

U.S. PATENT DOCUMENTS

| 5,533,055 A | * | 7/1996 | Matzek | 375/286 |
| 7,012,505 B1 | * | 3/2006 | Arden | 370/482 |
| 7,230,986 B2 | * | 6/2007 | Wise et al. | 375/240.26 |
| 8,330,535 B2 | * | 12/2012 | Kuo et al. | 327/551 |

* cited by examiner

*Primary Examiner* — Tesfaldet Bocure
(74) *Attorney, Agent, or Firm* — Winston Hsu; Scott Margo

(57) ABSTRACT

A circuit includes an oversampling logic unit, an alternating current estimator, and a logic processor. The oversampling logic unit generates a plurality of alternating current terms according to an oversampling clock, and outputs a plurality of alternating current terms corresponding to an output clock from the plurality of alternating current terms according to the output clock. The alternating current estimator executes a discrete cosine transform and a discrete sine transform on a plurality of alternating current terms outputted from the oversampling logic unit within a first predetermined time to generate a first value and a second value respectively. The logic processor compares a number of first values and a number of second values within a second predetermined time, and generates a clock data recovery phase locked indicator according to a comparing result.

7 Claims, 4 Drawing Sheets

CIRCUIT FOR GENERATING A CLOCK DATA RECOVERY PHASE LOCKED INDICATOR AND METHOD THEREOF

CROSS REFERENCE TO RELATED APPLICATIONS

This application claims the benefit of U.S. Provisional Application No. 61/357,088, filed on Jun. 21, 2010 and entitled "DC and AC Estimators for Equalizer Report and CDR lock indicator Report," and the benefit of U.S. Provisional Application No. 61/350,032, filed on Jun. 1, 2010 and entitled "Indicator which can Indicate Quality of the Receiver," the contents of which are incorporated herein by reference.

BACKGROUND OF THE INVENTION

1. Field of the Invention

The present invention is related to a circuit for generating a clock data recovery phase locked indicator and method thereof, and particularly to a circuit for generating a clock data recovery phase locked indicator and method thereof that generate the clock data recovery phase locked indicator according to a plurality of alternating current terms generated after an oversampling operation is executed on data transmitted from a channel.

2. Description of the Prior Art

In the prior art, a locked indicator of a clock data recovery circuit based on a phase-locked loop can be generated according to a phase-locked loop locked indicator. In addition, a clock data recovery phase locked indicator can also be generated by transmitting a known bit pattern and checking a bit error rate of returned bits, or by comparing a known reference clock with a clock of a clock data recovery circuit.

However, if the clock data recovery circuit is not based on the phase-locked loop, the clock data recovery phase locked indicator can not be generated according to the phase-locked loop locked indicator. Therefore, for the clock data recovery circuit not based on the phase-locked loop, the prior art has to utilize the known bit pattern and known reference clock to generate the clock data recovery phase locked indicator from data transmitted from a channel. That is to say, the above mentioned methods for generating the clock data recovery phase locked indicator are not better choices for a user.

SUMMARY OF THE INVENTION

An embodiment provides a circuit for generating a clock data recovery phase locked indicator. The circuit includes an oversampling logic unit, an alternating current estimator, and a logic processor. The oversampling logic unit is used for executing an oversampling operation on data from a channel to generate a plurality of alternating current terms according to an oversampling clock, and outputting a plurality of alternating current terms corresponding to an output clock from the plurality of alternating current terms according to the output clock. The alternating current estimator is coupled to the oversampling logic unit for executing a discrete cosine transform on a plurality of alternating current terms outputted from the oversampling logic unit to generate a first value, and executing a discrete sine transform on the plurality of alternating current terms outputted from the oversampling logic unit to generate a second value within a first predetermined time. The logic processor is coupled to the alternating current estimator for a number of the first values and a number of the second values within a second predetermined time, and generating a clock data recovery phase locked indicator according to a comparison result.

Another embodiment provides a method for generating a clock data recovery phase locked indicator. The method includes executing an oversampling operation on data from a channel to generate a plurality of alternating current terms according to an oversampling clock; outputting a plurality of alternating current terms corresponding to an output clock from the plurality of alternating current terms to an alternating current estimator according to the output clock; executing a discrete cosine transform on the plurality of alternating current terms inputted to the alternating current estimator to generate a first value, and executing a discrete sine transform on the plurality of alternating current terms inputted to the alternating current estimator to generate a second value within a first predetermined time; comparing a number of the first value and a number of the second value within a second predetermined time, and generating a clock data recovery phase locked indicator according to a comparison result.

The present invention provides a circuit for generating a clock data recovery phase locked indicator and method thereof utilize an alternating current estimator to execute a discrete cosine transform on a plurality of alternating current terms outputted from an oversampling logic unit within a first predetermined time to generate a first value, and to execute a discrete sine transform on the plurality of alternating current terms outputted from the oversampling logic unit within the first predetermined time to generate the second value. Then, a logic processor compares a number of the first values and a number of the second values within a second predetermined time, and generates a clock data recovery phase locked indicator according to a comparison result. Thus, the present invention does not require a phase-locked loop locked indicator, a known bit pattern, and a known reference clock to generate the clock data recovery phase locked indicator.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
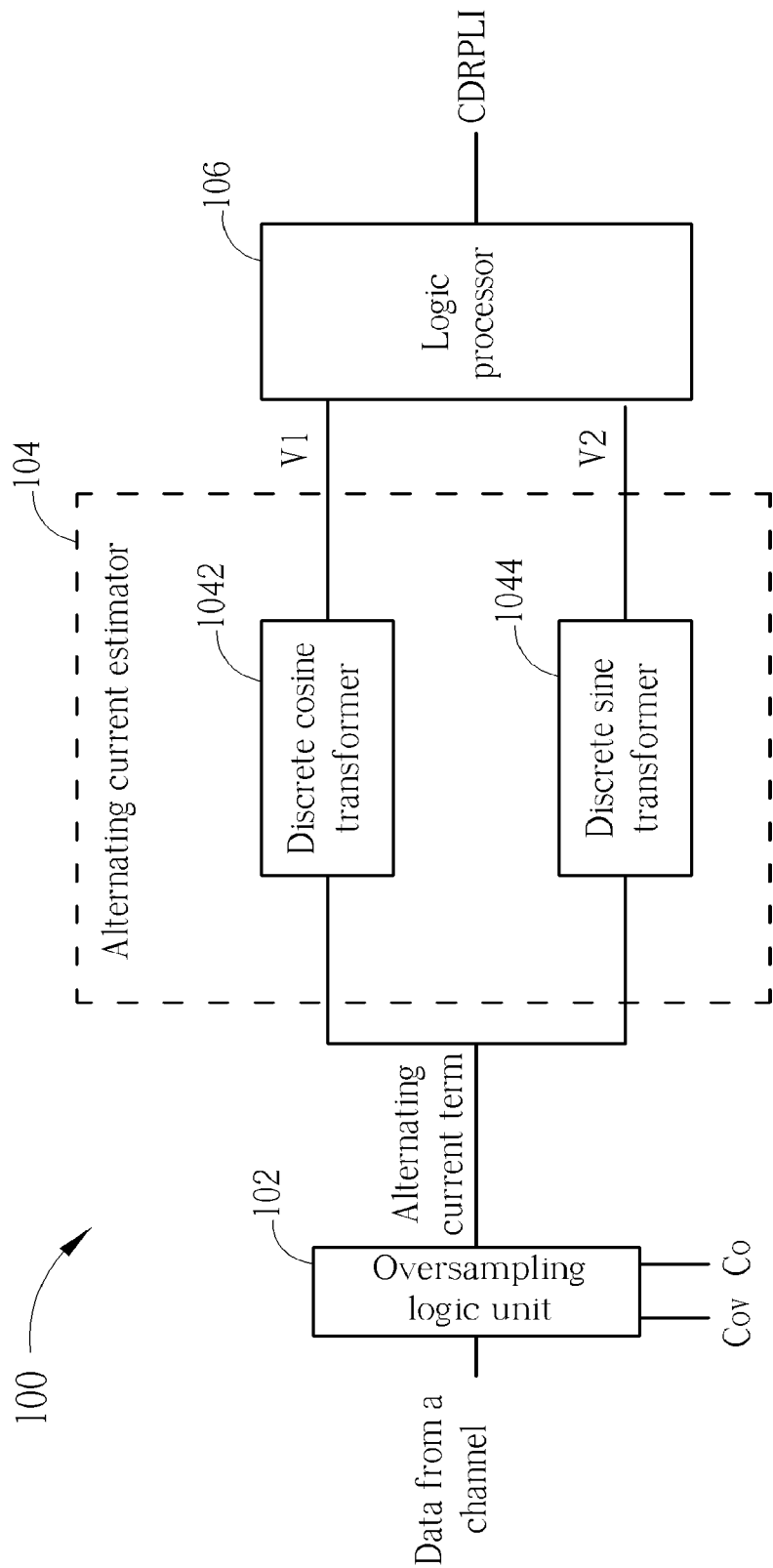
FIG. 1 is a diagram illustrating a circuit for generating a clock data recovery phase locked indicator according to an embodiment.

Please refer to FIG. 1. FIG. 1 is a diagram illustrating a circuit 100 for generating a clock data recovery phase locked indicator according to an embodiment. The circuit 100 includes an oversampling logic unit 102, an alternating current estimator 104, and a logic processor 106. The oversampling logic unit 102 is used for executing an oversampling operation on data from a channel to generate a plurality of alternating current terms according to an oversampling clock Cov, and outputting a plurality of alternating current terms corresponding to an output clock Co from the plurality of alternating current terms according to the output clock Co. In addition, frequency of the oversampling clock Cov is more than twice frequency of the data from the channel. In the present invention, the frequency of the oversampling clock Cov is 10 GHz and the frequency of the data from the channel is 2.5 GHz. But, the present invention is not limited to the frequency of the oversampling clock Cov being 10 GHz and the frequency of the data from the channel being 2.5 GHz.

Figure 2:
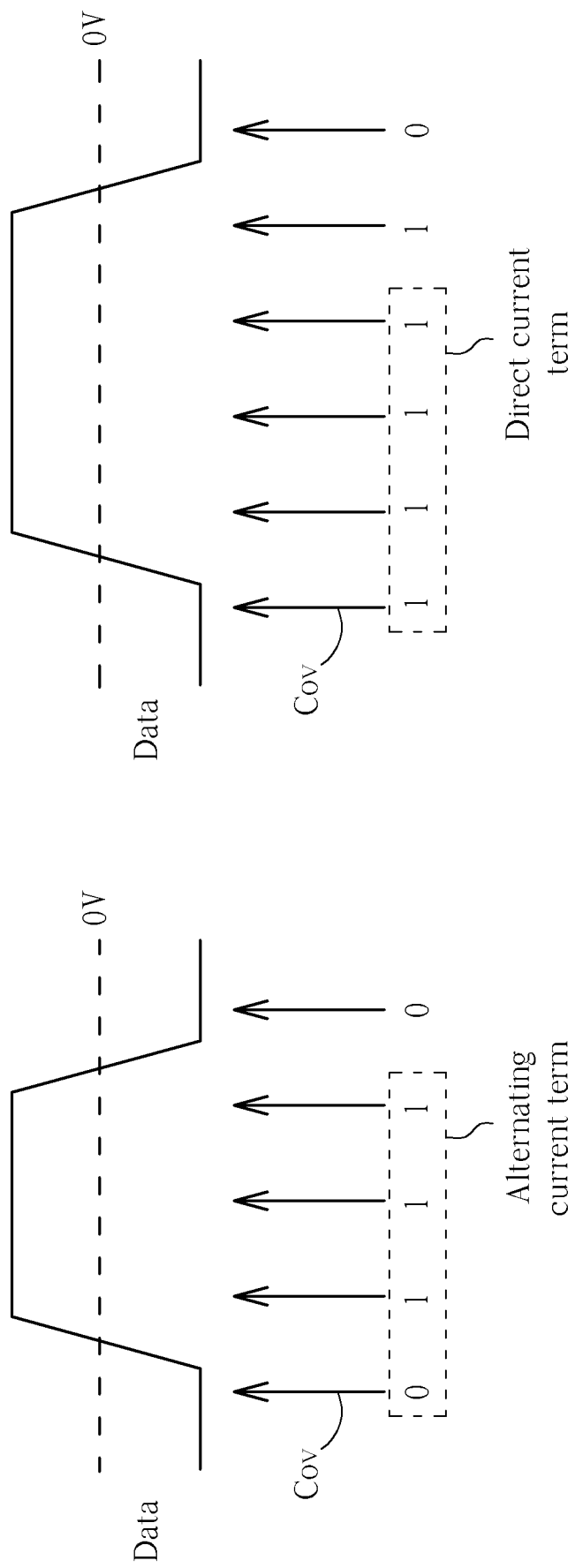
FIG. 2A and FIG. 2B are diagrams illustrating a direct current term and an alternating current term outputted from the oversampling logic unit.
Figure 4:
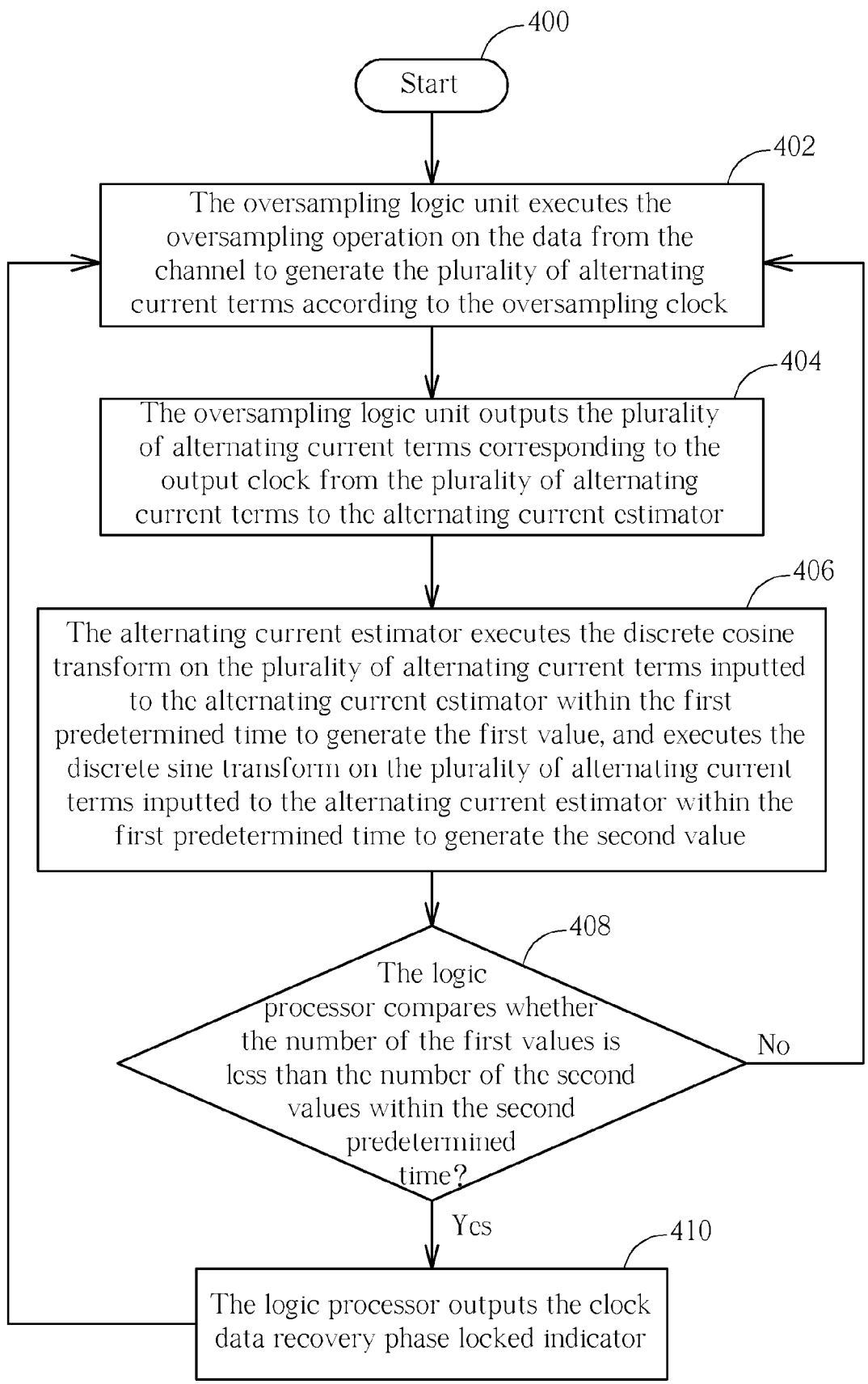
FIG. 4 is a flowchart illustrating a method for generating a clock data recovery phase locked indicator according to another embodiment.

Please refer to FIG. 2A and FIG. 2B. FIG. 2A and FIG. 2B are diagrams illustrating a direct current term and an alternating current term outputted from the oversampling logic unit 202. Because the frequency of the oversampling clock Cov is 10 GHz and the frequency of the data from the channel is 2.5 GHz, the direct current term and the alternating current term outputted from the oversampling logic unit 202 are 4-bit terms (10 GHz/2.5 GHz=4). When 4 bits of a 4-bit term are not all "0" or all "1", the oversampling logic unit 202 records the 4-bit term as an alternating current term. As shown in FIG. 2A, 4 bits of a 4-bit term are "0111", so the oversampling logic unit 202 records the 4-bit term "0111" as an alternating current term. Similarly, when 4 bits of a 4-bit term are all "0" or all "1", the oversampling logic unit 202 records the 4-bit term as a direct current term. As shown in FIG. 2B, 4 bits of a 4-bit term are "1111", so the oversampling logic unit 202 records the 4-bit term "1111" as a direct current term.

Figure 3:
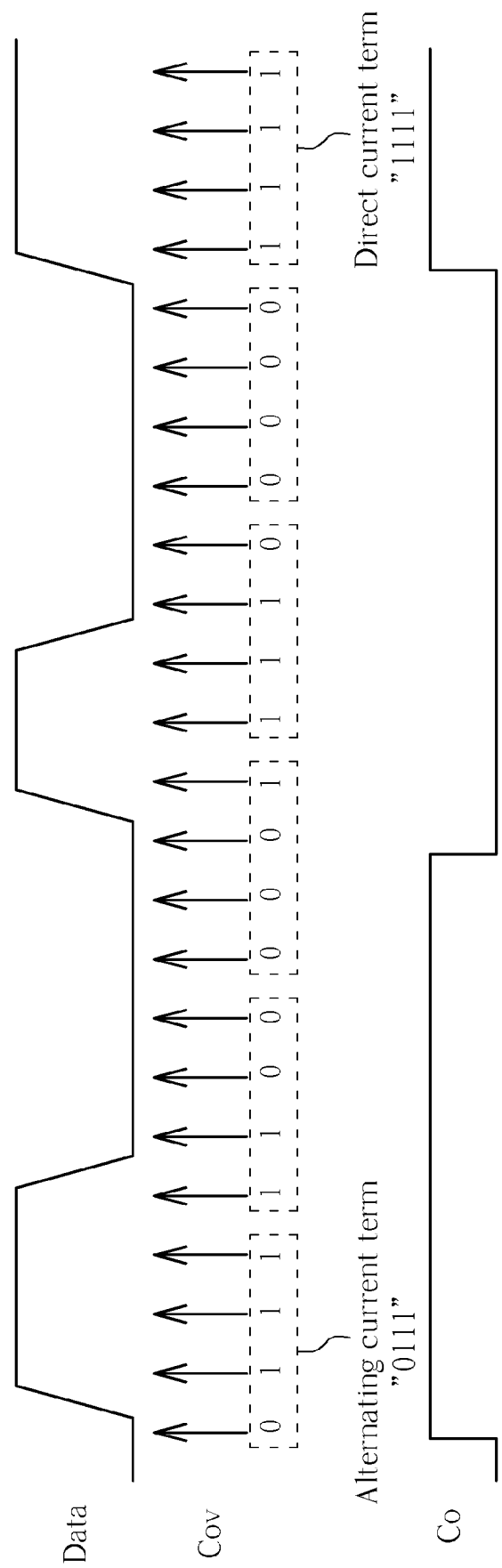
FIG. 3 is a diagram illustrating the oversampling logic unit outputting alternating current terms corresponding to the output clock according to the output clock.

Please refer to FIG. 3. FIG. 3 is a diagram illustrating the oversampling logic unit 202 outputting alternating current terms corresponding to the output clock Co according to the output clock Co. The oversampling logic unit 102 continuously utilizes the oversampling clock Cov to execute the oversampling operation on the data from the channel for generating the plurality of direct current terms and the plurality of alternating current terms. However, the oversampling logic unit 202 only outputs a last recorded alternating current term at a positive edge of the output clock Co. But, the present invention is not limited to the oversampling logic unit 202 outputting the last recorded alternating current term at the positive edge of the output clock Co. That is to say, the oversampling logic unit 202 can also output the last recorded alternating current term at a negative edge of the output clock Co. Therefore, the oversampling logic unit 202 outputs the plurality of alternating current terms corresponding to the output clock Co to the alternating current estimator 104 according to the output clock Co.

The alternating current estimator 104 coupled to the oversampling logic unit 102 includes a discrete cosine transformer 1042 and a discrete sine transformer 1044. The discrete cosine transformer 1042 is used for executing a discrete cosine transform on a plurality of alternating current terms outputted from the oversampling logic unit 202 within a first predetermined time T1 to generate a first value V1 (such as 0 or 1). The discrete sine transformer 1044 is used for executing a discrete sine transform on the plurality of alternating current terms outputted from the oversampling logic unit 202 within the first predetermined time T1 to generate a second value V2 (such as 1 or 0). The logic processor 106 is coupled to the alternating current estimator 104 for comparing a number of the first values V1 and a number of the second values V2 within a second predetermined time T2, and generating a clock data recovery phase locked indicator CDRPLI according to a comparison result. When the number of the first values V1 is less than the number of the second values V2 within the second predetermined time T2, the logic processor 106 generates the clock data recovery phase locked indicator CDRPLI.

Please refer to FIG. 4. FIG. 4 is a flowchart illustrating a method for generating a clock data recovery phase locked indicator according to another embodiment. FIG. 4 uses the circuit 100 in FIG. 1 to illustrate the method. Detailed steps are as follows:

Step 400: Start.

Step 402: The oversampling logic unit 202 executes the oversampling operation on the data from the channel to generate the plurality of alternating current terms according to the oversampling clock Cov.

Step 404: The oversampling logic unit 202 outputs the plurality of alternating current terms corresponding to the output clock Co from the plurality of alternating current terms to the alternating current estimator 104.

Step 406: The alternating current estimator 104 executes the discrete cosine transform on the plurality of alternating current terms inputted to the alternating current estimator 104 within the first predetermined time T1 to generate the first value V1, and executes the discrete sine transform on the plurality of alternating current terms inputted to the alternating current estimator 104 within the first predetermined time T1 to generate the second value V2.

Step 408: The logic processor 106 compares whether the number of the first values V1 is less than the number of the second values V2 within the second predetermined time T2. If yes, go to Step 410; if not, go to Step 402.

Step 410: The logic processor 106 outputs the clock data recovery phase locked indicator CDRPLI; go to Step 402.

In Step 402, the frequency of the oversampling clock Cov is more than twice the frequency of the data from the channel. In FIG. 4, the frequency of the oversampling clock Cov is 10 GHz and the frequency of the data is 2.5 GHz. But, the present invention is not limited to the frequency of the oversampling clock Cov being 10 GHz and the frequency of the data from the channel being 2.5 GHz. In Step 404, according to the positive edge or the negative edge of the output clock Co, the oversampling logic unit 202 outputs the plurality of alternating current terms corresponding to the output clock Co to the alternating current estimator 104. In Step 410, when the number of the first values V1 is less than the number of the second values V2 within the second predetermined time T2, the logic processor 106 outputs the clock data recovery phase locked indicator CDRPLI.

To sum up, the circuit for generating the clock data recovery phase locked indicator and method thereof utilize the alternating current estimator to execute the discrete cosine transform on the plurality of alternating current terms outputted from the oversampling logic unit within the first predetermined time to generate the first value, and to execute the discrete sine transform on the plurality of alternating current terms outputted from the oversampling logic unit within the first predetermined time to generate the second value. Then, the logic processor compares the number of the first values and the number of the second values within the second predetermined time, and generates the clock data recovery phase locked indicator according to the comparison result. Thus, the present invention does not require a phase-locked loop locked indicator, a known bit pattern, and a known reference clock to generate the clock data recovery phase locked indicator.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit for generating a clock data recovery phase locked indicator, the circuit comprising:

an oversampling logic unit for executing an oversampling operation on data from a channel to generate a plurality of alternating current terms according to an oversampling clock, and outputting a plurality of alternating current terms corresponding to an output clock from the plurality of alternating current terms according to the output clock;

an alternating current estimator coupled to the oversampling logic unit for executing a discrete cosine transform on the plurality of alternating current terms outputted from the oversampling logic unit to generate a first value, and executing a discrete sine transform on the plurality of alternating current terms outputted from the oversampling logic unit to generate a second value within a first predetermined time; and a logic processor coupled to the alternating current estimator for comparing a number of the first values and a number of the second values within a second predetermined time, and generating the clock data recovery phase locked indicator according to a comparison result.

2. The circuit of claim 1, wherein a frequency of the oversampling clock is more than twice a frequency of the data from the channel.

3. The circuit of claim 1, wherein the alternating current estimator comprises:

a discrete cosine transformer for executing the discrete cosine transform on the plurality of alternating current terms outputted from the oversampling logic unit to generate the first value; and a discrete sine transformer for executing the discrete sine transform on the plurality of alternating current terms outputted from the oversampling logic unit to generate the second value.

4. The circuit of claim 1, wherein when the first value is less than the second value, the logic processor generates the clock data recovery phase locked indicator.

5. A method for generating a clock data recovery phase locked indicator, the method comprising:

executing an oversampling operation on data from a channel to generate a plurality of alternating current terms according to an oversampling clock;

outputting a plurality of alternating current terms corresponding to an output clock from the plurality of alternating current terms to an alternating current estimator according to the output clock;

executing a discrete cosine transform on the plurality of alternating current terms inputted to the alternating current estimator to generate a first value, and executing a discrete sine transform on the plurality of alternating current terms inputted to the alternating current estimator to generate a second value within a first predetermined time; and comparing a number of the first value and a number of the second value within a second predetermined time, and generating the clock data recovery phase locked indicator according to a comparison result.

6. The method of claim 5, wherein a frequency of the oversampling clock is more than twice a frequency of the data from the channel.

7. The method of claim 5, wherein when the first value is less than the second value, the logic processor generates the clock data recovery phase locked indicator.

* * * * *

UNITED STATES PATENT AND TRADEMARK OFFICE
CERTIFICATE OF CORRECTION

PATENT NO. : 8,675,799 B2  
APPLICATION NO. : 13/050968  
DATED : March 18, 2014  
INVENTOR(S) : Shiu et al.

It is certified that error appears in the above-identified patent and that said Letters Patent is hereby corrected as shown below:

On the title page, item [60] correct the filing date of 61/350,032 from "Jun. 1, 201" to --Jun. 1, 2010--.

Signed and Sealed this  
Seventeenth Day of June, 2014

Michelle K. Lee  
*Deputy Director of the United States Patent and Trademark Office*